United States Patent
Inagaki

(10) Patent No.: US 7,030,928 B2
(45) Date of Patent: Apr. 18, 2006

(54) INFORMATION DISPLAY CONTROL IN IMAGE SENSING APPARATUS

(75) Inventor: Atsushi Inagaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 914 days.

(21) Appl. No.: 09/821,287

(22) Filed: Mar. 29, 2001

(65) Prior Publication Data

US 2002/0054232 A1    May 9, 2002

(30) Foreign Application Priority Data

Mar. 31, 2000    (JP) ............................. 2000-097628

(51) Int. Cl.
    H04N 5/225    (2006.01)
    H04N 5/222    (2006.01)
(52) U.S. Cl. ............. 348/372; 348/333.04; 348/333.13
(58) Field of Classification Search .......... 348/207.99, 348/333.01, 333.02, 333.04, 333.12, 333.13, 348/371, 372
    See application file for complete search history.

(56) References Cited

U.S. PATENT DOCUMENTS

| | | | |
|---|---|---|---|
| 6,011,585 A * | 1/2000 | Anderson .................... 348/272 |
| 6,362,851 B1 * | 3/2002 | Lavelle et al. .......... 348/333.01 |
| 6,661,454 B1 * | 12/2003 | Hwang et al. ............. 348/231.1 |
| 6,710,809 B1 * | 3/2004 | Niikawa ..................... 348/372 |
| 6,714,245 B1 * | 3/2004 | Ono ....................... 348/333.13 |
| 6,724,427 B1 * | 4/2004 | Fredlund et al. ....... 348/333.07 |
| 6,844,899 B1 * | 1/2005 | Oeda et al. ............ 348/333.13 |

* cited by examiner

*Primary Examiner*—Ngoc-Yen Vu
*Assistant Examiner*—Luong T. Nguyen
(74) *Attorney, Agent, or Firm*—Morgan & Finnegan, LLP

(57) ABSTRACT

To display information about an image sensing apparatus on a display when the display is OFF, the display is turned ON for only a predetermined time and displays the information in the image sensing apparatus having an image sensor and the display for displaying an image obtained by the image sensor and information about the status of the image sensing apparatus.

3 Claims, 8 Drawing Sheets

INFORMATION DISPLAY CONTROL IN IMAGE SENSING APPARATUS

FIELD OF THE INVENTION

The present invention relates to an image sensing apparatus and, more particularly, to display control of information about an image sensing apparatus in the image sensing apparatus.

BACKGROUND OF THE INVENTION

Image sensing apparatuses such as an electronic camera for recording and playing back still images and moving images by using a memory card having a solid-state memory device as a recording medium have already been available. Electronic cameras having not only optical finders but also electronic finders such as a color liquid crystal panel are also becoming popular.

Such an electronic camera displays pieces of information about the apparatus status (the remaining number of sensible images, setting information such as the image size, warnings and the like) on a dedicated information display unit such as a monochrome LCD, and an electronic finder.

This image sensing apparatus such as a conventional electronic camera can be downsized by displaying pieces of information about the apparatus status on only an electronic finder such as a color crystal panel because the dedicated information display unit can be eliminated.

If, however, the color liquid crystal panel is always kept ON in order to display pieces of information about the apparatus status, the electronic camera operation time and the number of sensible images greatly decrease owing to high electric consumption of the color liquid crystal panel or the like.

SUMMARY OF THE INVENTION

The present invention has been made in consideration of the above situation, and has as its object to suppress the electric consumption in an image sensing apparatus using an image display unit to display information about the image sensing apparatus, such as a set status and a warning, when a dedicated information notification unit for displaying the information is omitted.

According to the present invention, the foregoing object is attained by providing an image sensing apparatus comprising: an image sensor; a display for displaying an image obtained by the image sensor and information about a status of the image sensing apparatus, the information is different from the image; a power supply unit for supplying power to processing circuits including the image sensor and the display; and a controller for controlling operating statuses of the display and the power supply unit, wherein the controller controls supply of power to the display so as to set the display ON for a predetermined period and only display the information which is different from the image when the display is OFF and the information is to be displayed on the display.

According to the present invention, the foregoing object is attained by providing a display method in an image sensing apparatus having an image sensor and a display for displaying an image obtained by the image sensor and information about a status of the image sensing apparatus, the information is different from the image, the method comprising: a display step of turning ON the display device and displaying only the information which is different from the image when the display device is OFF; and a monitoring step of monitoring a display period in the display step so as not to exceed a predetermined period.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

First Embodiment

Figure 1:
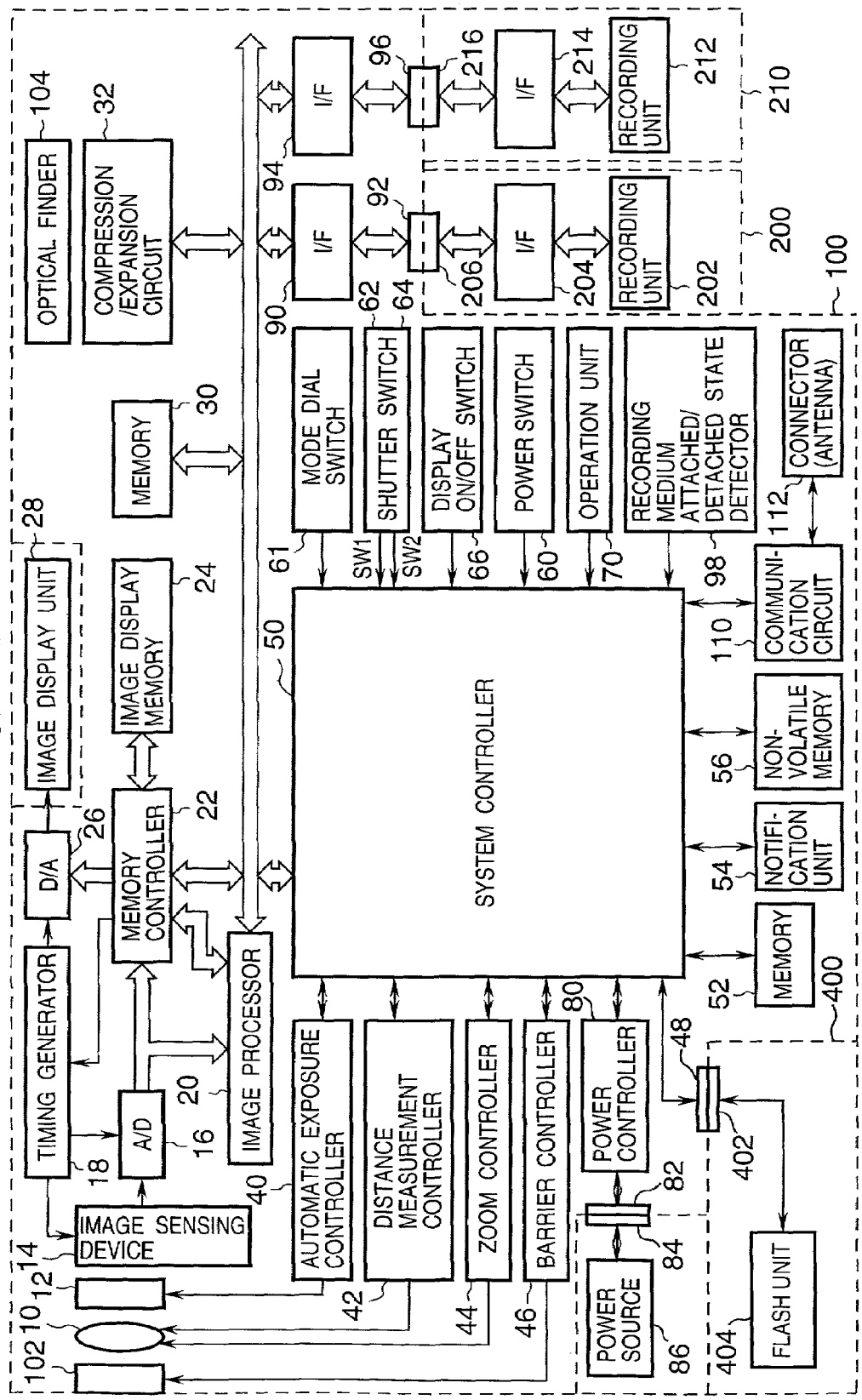
FIG. 1 is a block diagram showing a configuration of an image sensing apparatus according to the first embodiment of the present invention.

FIG. 1 is a block diagram showing a configuration of an image sensing apparatus according to the first embodiment of the present invention.

In FIG. 1, reference numeral 100 denotes an image sensing apparatus such as a digital camera. In the image sensing apparatus 100, 10 denotes an image sensing lens made up of a zoom lens and a focus lens each having an in-focus position with respect to an object to be sensed; 12, a shutter having a diaphragm function; 14, an image sensing device which converts an optical image into an electric signal; 16, an A/D converter which converts an analog signal output from the image sensing device 14 into a digital signal; 18, a timing generator which supplies a clock signal and a control signal respectively to the A/D converter 16 and a D/A converter 26, under the control of a memory controller 22 and a system controller 50.

Numeral 20 denotes an image processor which performs predetermined pixel interpolation processing, color conversion processing and the like on data from the A/D converter 16 or data from the memory controller 22. The image processor 20 performs predetermined calculation processing using the sensed image data, and the system controller 50 performs Through-The-Lens (TTL) Auto Focus (AF) processing, Auto Exposure (AE) processing, pre-Flash (EF) processing on an exposure controller 40 and a distance measurement controller 42, based on the result of calculations. Further, the image processor 20 performs predetermined calculation processing using the sensed image data, and performs TTL Auto White Balance (AWB) processing, based on the result of calculations.

The memory controller 22 controls the A/D converter 16, the timing generator 18, the image processor 20, an image display memory 24, the D/A converter 26, a memory 30 and a compression/expansion circuit 32. The data outputted from the A/D converter 16 is written into the image display memory 24 or the memory 30 via the image processor 20 and the memory controller 22, or only via the memory controller 22.

Numeral 28 denotes a display unit comprising a TFT LCD or the like. Image data written into the image display memory 24 is displayed on the display unit 28 via the D/A converter 26. An electronic finder function can be realized by sequentially displaying sensed image data on the display unit 28. Further, the display unit 28 can arbitrarily turn ON/OFF a liquid crystal unit and an illumination unit for illuminating the liquid crystal unit, in accordance with an instruction from the system controller 50. If the display is turned OFF, the electric consumption of the image sensing apparatus 100 can be greatly reduced.

The memory 30, used for storing sensed still images and moving images, has a sufficient storage capacity for storing a predetermined number of still images and a moving image for a predetermined time. In sequential image sensing to sequentially obtain a plural number of still images or panoramic images sensing, a large amount of image data can be written into the memory 30 at a high speed. Further, the memory 30 may be used as a work area for the system controller 50.

The compression/expansion circuit 32 compresses or expands image data by adaptive discrete cosine transformation (ADCT) or the like. The compression/expansion circuit 32 reads image data stored in the memory 30, performs compression or expansion processing on the read image data, and writes the processed data into the memory 30.

The exposure controller 40 controls the shutter 12 having the diaphragm function. The exposure controller 40 interlocked with a flash unit 404 also has a flash adjusting function. The distance measurement controller 42 controls focusing of the image sensing lens 10. Numeral 44 denotes a zoom controller which controls zooming of the image sensing lens 10. Numeral 46 denote a barrier controller which controls the operation of a barrier 102 to protect the lens.

Numeral 404 denotes a flash unit which has an AF auxiliary light projection function and a flash adjusting function.

The exposure controller 40 and the distance measurement controller 42 are controlled using the TTL method. The system controller 50 controls the exposure controller 40 and the distance measurement controller 42, in accordance with the result of calculations by the image processor 20 based on sensed image data.

The system controller 50 controls the overall image sensing apparatus 100. Numeral 52 denotes a memory which stores the constants, variables, and programs for operation of the system controller 50; and 54, a notification unit which is constituted by an LED, a sound generating device and the like, and notifies the user of operating statuses, in correspondence with execution of program by the system controller 50. The notification unit 54 is simple and does not require much space and any high electric consumption.

Numeral 56 denotes an electrically erasable and recordable nonvolatile memory such as an EEPROM. Numerals 60, 61, 62, 64, 66 and 70 denote operation units for inputting various operation instructions to the system controller 50, comprising a single or plurality of combinations of switches, dials, touch panels, a device for pointing by line-of-sight detection, a voice recognition device, and the like.

Next, the operation units will be described. The operation unit 60 is a power switch for turning ON/OFF the image sensing apparatus 100. The operation unit 61 is a mode dial switch for setting an image sensing mode and a playback mode.

The operation unit 62 is a shutter switch SW1 turned ON by half stroke of a shutter button (not shown), to instruct start of the operations of the AF processing, the AE processing, the AWB processing, the EF processing and the like.

The operation unit 64 is a shutter switch SW2 turned ON by full stroke of the shutter button (not shown), to instruct start of a series of operations of exposure processing to write a signal read from the image sensing device 14 into the memory 30, via the A/D converter 16 and the memory controller 22, development processing by using calculations by the image processor 20 and the memory controller 22, and recording processing to read the image data from the memory 30, compress the image data by the compression/expansion circuit 32, and write the compressed image data into a recording medium 200 or 210.

The operation unit 66 is an ON/OFF switch which supplies/stops power to the display unit 28 and can set ON/OFF of the display unit 28. With this function, in image sensing using the optical finder 104, power supply to the display unit 28 comprising a TFT LCD or the like can be cut to save the power.

The operation unit 70 comprises various buttons and touch panels including a menu button, a set button, a macro/non-macro selection button, a multi-image reproduction/repaging button, a flash set button, a single-shot/sequential/self-timer image sensing selection button, a forward (+) menu item selection button, a backward (−) menu item selection button, a forward (+) reproduction image search button, a backward (−) reproduction image search button, an image sensing quality selection button, an exposure correction button, and a date/time set button.

Numeral 80 denotes a power controller comprising a battery detection circuit, a DC-DC converter, a switch circuit to select the block to be energized and the like. The power controller 80 detects the attached/detached state of the battery, the battery type and the remaining battery power level, controls the DC-DC converter based on the results of detection and an instruction from the system controller 50, and supplies a necessary voltage to the respective parts including the recording medium for the necessary period.

Numerals 82 and 84 denote connectors; and 86, a power source comprising a primary battery such as an alkaline battery or a lithium battery, a secondary battery such as an NiCd battery, an NiMH battery or an Li battery, an AC adapter, and the like.

Numerals 90 and 94 denote interfaces for recording media such as a memory card or a hard disk; 92 and 96, connectors for connection with the recording media such as a memory card or a hard disk; and 98, a recording medium attached/detached state detector which detects whether the recording medium 200 and/or 210 is attached to the connector 92 and/or connector 96.

In the first embodiment, two systems of interfaces and connectors for connection with the recording media are employed. However, the number of systems is not limited, and a single or plurality of systems of interfaces and connectors may be provided. Further, interfaces and connectors pursuant to different standards may be combined.

As the interfaces and connectors, cards in conformity with PCMCIA card standards and cards in conformity with CF (Compact Flash) card standards may be used. In a case where cards and connectors in conformity with the PCMCIA card standards, CF card standards and the like are used as the interfaces 90 and 94 and the connectors 92 and 96, image data and management information attached to the image data can be transmitted/received to/from other peripheral devices such as a computer and a printer by connection with various communication cards such as a LAN card, a modem card, a USB card, an IEEE 1394 card, a P1284 card, a SCSI card and a PHS card.

The barrier 102 covers the image sensing portion of the image sensing apparatus 100 including the lens 10, thus prevents dirt and breakage of the image sensing portion. The optical finder 104 can be used for image sensing without the electronic finder function by the display unit 28.

Numeral 110 denotes a communication circuit having various communication functions which realize RS232C, USB, IEEE 1394, P1284, SCSI, a modem, a LAN, radio communication and the like.

Numeral 112 denotes a connector for connecting the image sensing apparatus 100 to another device, or denotes an antenna for radio communication.

The recording media 200 and 210 are realized by memory cards, hard disks or the like. The recording media 200 and 210 respectively comprise recording units 202 and 212 of semiconductor memories, magnetic disks or the like, interfaces 204 and 214 for communication with the image sensing apparatus 100, and connectors 206 and 216 for connection with the image sensing apparatus 100.

The operation of the first embodiment will be explained with reference to FIGS. 2 to 4.

Figure 2A:
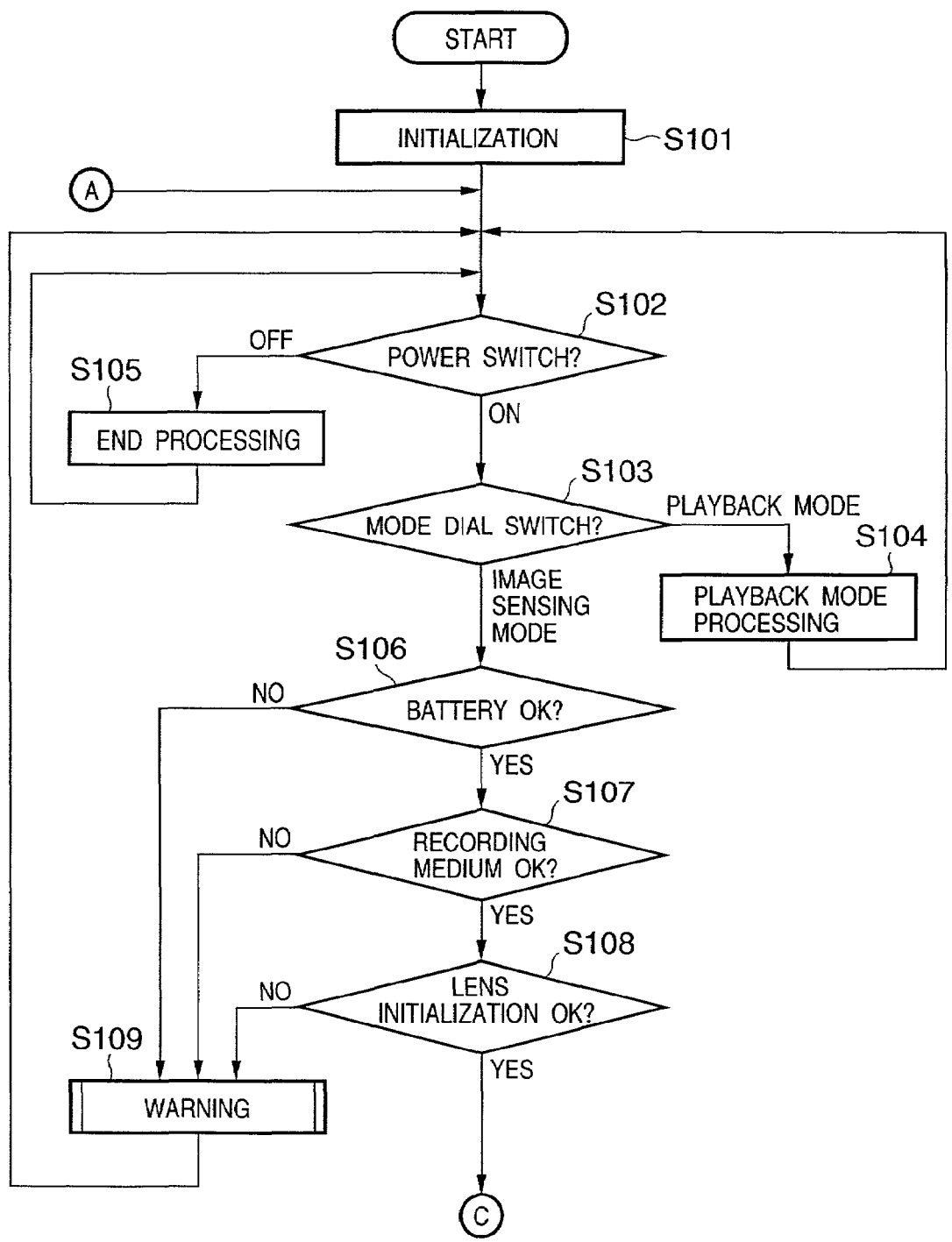
FIGS. 2A and 2B are flow charts showing the operation of the image sensing apparatus according to the first embodiment of the present invention.
Figure 2B:
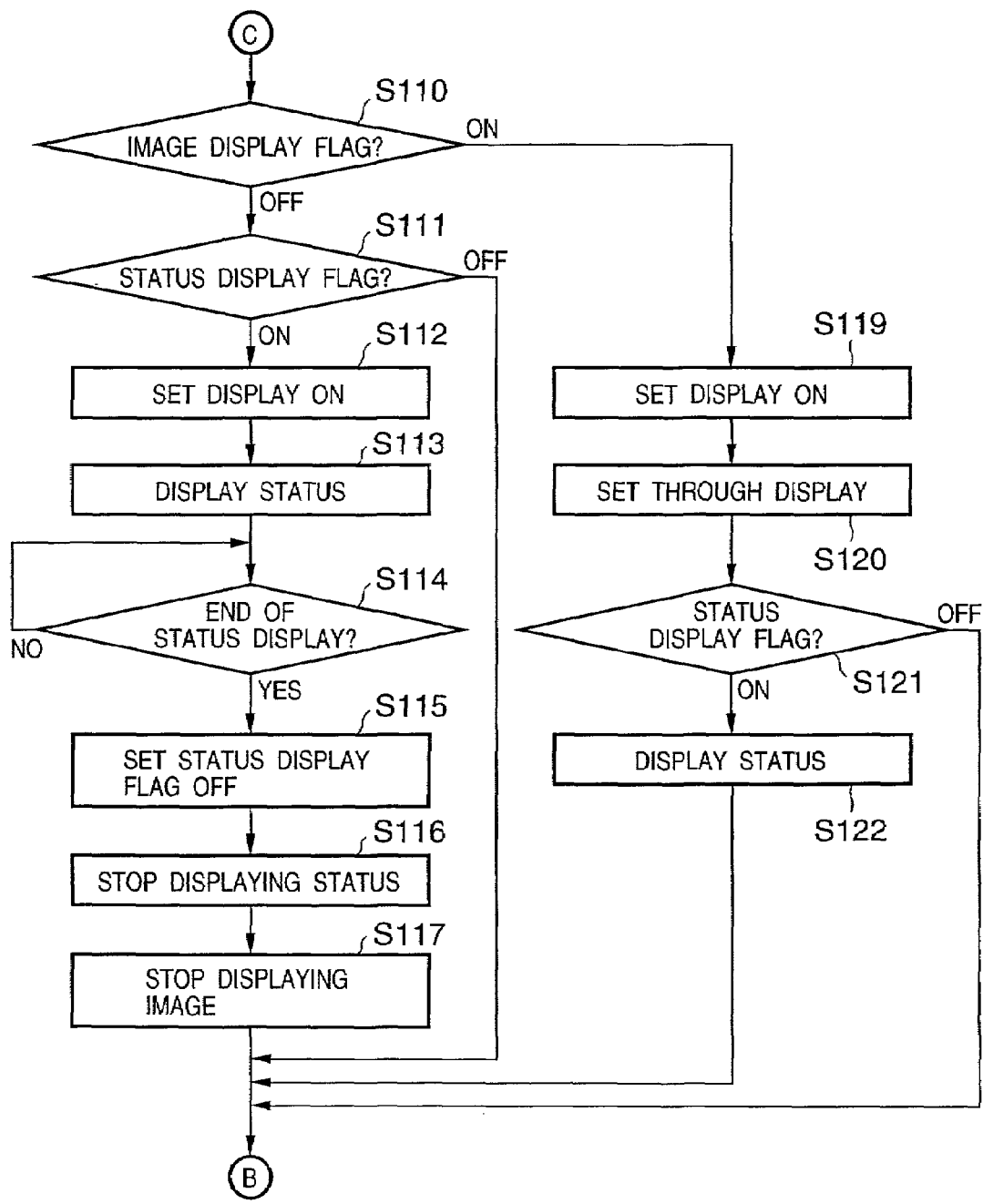
Figure 3:
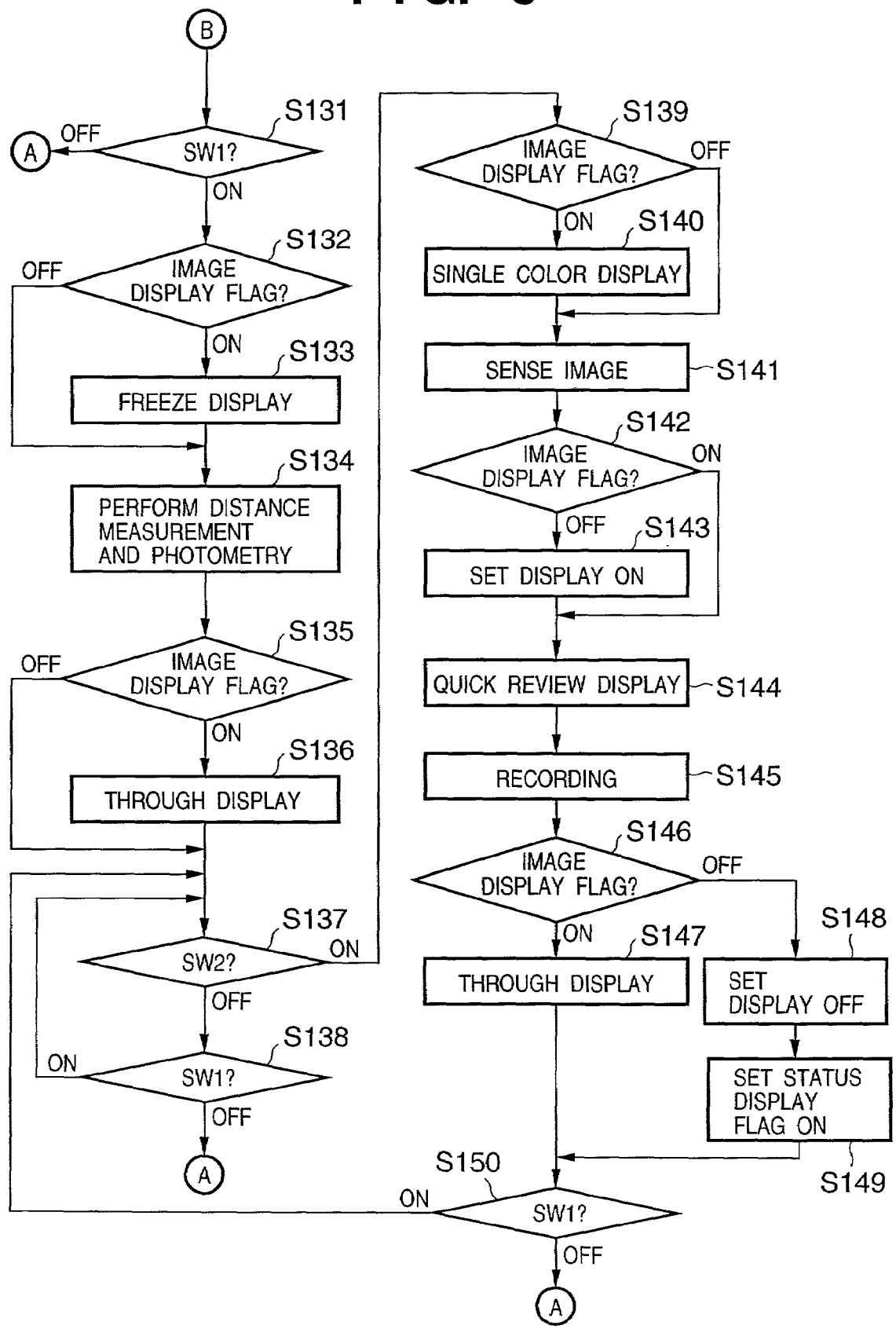
FIG. 3 is a flow chart showing the operation of the image sensing apparatus according to the first embodiment of the present invention.

FIGS. 2 and 3 are flow charts showing the main routine in the system controller 50 of the image sensing apparatus 100 according to the first embodiment. The operation of the image sensing apparatus 100 will be described with reference to FIGS. 2A, 2B and 3.

The system controller 50 initializes flags, control variables and the like, in response to power-on operation such as battery exchange (step S101). The system controller 50 checks the status of the power switch 60 (step S102). If the power switch 60 is set OFF, the system controller 50 performs predetermined end processing such that the system controller 50 changes the display of each display unit to an end status, closes the barrier 102 to protect the image sensing unit, stores in the nonvolatile memory 56 necessary parameters, set values and set modes including the flags, the control variables and the like, and causes the power controller 80 to stop unnecessary power to each part of the image sensing apparatus 100 including the display unit 28 (step S105). Then, the system controller 50 returns to step S102.

If the power switch 60 is set ON in step S102, the system controller 50 determines the set position of the mode dial switch 61 (step S103). If the mode dial switch 61 is set in the playback mode, the system controller 50 executes playback processing of a stored image (step S104), then returns to step S102.

If the mode dial switch 61 is set in the image sensing mode in step S103, the system controller 50 causes the power controller 80 to determine whether the remaining capacity or operating status of the power source 86 formed from a battery or the like is sufficient for the operation of the image sensing apparatus 100 (step S106). If NO in step S106, the system controller 50 executes predetermined warning (step S109), and returns to step S102. Processing in step S109 will be described later with reference to FIG. 4.

In YES in step S106, the system controller 50 determines whether the operating status of the recording medium 200 or 210 is satisfactory for the operation of the image sensing apparatus 100, particularly recording/playback operation of image data on/from the recording medium (step S107). If NO in step S107, the system controller 50 executes predetermined warning (step S109), and returns to step S102.

If YES in step S107, the system controller 50 initializes the image sensing lens 10, and determines whether the image sensing lens 10 operates normally (step S108). If NO in step S108, the system controller 50 uses the notification unit 54 to issue a predetermined warning by emitting light or generating a sound (step S109), and then returns to step S102.

If YES in step S108, the system controller 50 checks the status of an image display flag (step S110). If the image display flag is set ON, the system controller 50 sets the display of the display unit 28 ON, and starts supplying power to the display unit (step S119). Then, the system controller 50 sets a through display status in which images sensed by the image sensing device 14 are sequentially displayed (step S120), and advances to step S121.

The through display of the display unit 28 is attained by outputting data sequentially written into the image display memory 24 via the image sensing device 14, the A/D converter 16, the image processor 20 and the memory controller 22, to the display unit 28 via the memory controller 22 and the D/A converter 26.

If a status display flag representing whether to display pieces of information about the status of the image sensing apparatus 100 (information such as the remaining number of sensible images and the image size) is set ON in step S121, the system controller 50 displays the status of the image sensing apparatus 100 on the display unit 28 for a predetermined time (step S122), and advances to step S131. If the status display flag is set OFF in step S121, the system controller 50 shifts to step S131 while keeping displaying images sensed by the image sensing device 14 in the through display status.

If the image display flag is set OFF in step S110, the system controller 50 checks the status display flag (step S111). If the status display flag is set ON, the system controller 50 sets the display of the display unit 28 ON (starts supplying power to the display unit 28) (step S112), and only displays the status of the image sensing apparatus 100 on the display unit 28 for a predetermined time (step S113). Note that the status of the image sensing apparatus 100 is different from image data picked up by image sensing device 104. The system controller 50 keeps displaying the setting information for a predetermined status display period (step S114). After the period has elapsed, the system controller 50 sets the status display flag OFF (step S115), and stops displaying the setting information (step S116). Then, the system controller 50 sets the display of the display unit 28 OFF (stops supplying power to the display unit 28) (step S117), and shifts to step S131.

The display contents relating to the status of the image sensing apparatus 100 displayed on the display unit 28 include the remaining capacity of the memory 30 or the recording medium 200 or 210, ON/OFF state of automatic illumination by the flash unit 404, ON/OFF state of pink-eye effect mitigation, ON/OFF state of macro image sensing mode, ON/OFF state of sequential image sensing mode, ON/OFF state of self timer, and so on.

If the status display flag is set OFF in step S111, the process directly shifts to step S131.

If the shutter switch SW1 is not pressed in step S131, the process returns to step S102. If the shutter switch SW1 is pressed in step S131, the system controller 50 checks the status of the image display flag stored in the internal memory of the system controller 50 or the memory 52 (step S132). If the image display flag is set ON, the system controller 50 sets to freeze display state the display unit 28 (step S133), and advances to step S134.

Freeze display of the sensed image on the display unit 28 is achieved by inhibiting rewrite of image data in the image display memory 24 via the image sensing device 14, the A/D converter 16, the image processor 20 and the memory controller 22, and outputting latest image data in the image display memory 24 to the display unit 28 via the memory controller 22 and the D/A converter 26.

If the image display flag is set OFF (NO in step S132), the process directly shifts to step S134. The system controller 50 performs distance measurement processing, adjusts the focus of the image sensing lens 10 to an object to be sensed, and performs photometry processing to determine an F-number and shutter speed (step S134). If necessary, the system controller 50 also sets the flash unit in photometry processing.

After the end of distance measurement/photometry processing in step S134, the system controller 50 checks the status of the image display flag stored in the internal memory of the system controller 50 or the memory 52 (step S135). If the image display flag is set ON, the system controller 50 sets the display status of the display unit 28 to the through display status (step S136), and advances to step S137. Note that the through display status in step S136 is the same operating status as the through status set in step S120.

If the image display flag is not set in step S135, the process shifts to step S137. If the shutter switch SW2 is not pressed in step S137, and the shutter switch SW1 is released in step S138, the process returns to step S102. If the shutter switch SW2 is pressed in step S137, the system controller 50 checks the status of the image display flag stored in the status of the internal memory of the system controller 50 or the memory 52 (step S139). If the image display flag is set ON, the system controller 50 sets the display status of the display unit 28 to a single color display status (step S140), and the process advances to step S141.

Single color display processing of the display unit 28 is realized by outputting replaced image data representing a single color to the display unit 28 via the memory controller 22 and the D/A converter 26, instead of sensed image data written in the image display memory 24 via the image sensing device 14, the A/D converter 16, the image processor 20 and the memory controller 22.

If the image display flag is set OFF in step S139, the process shifts to step S141. The system controller 50 executes image sensing processing including exposure processing of writing sensed image data in the memory 30 via the image sensing device 14, the A/D converter 16, the image processor 20 and memory controller 22 or via the memory controller 22 directly from the A/D converter 16, and developing processing of reading out image data written in the memory 30 and performing various processes by using the memory controller 22 and if necessary, the image processor 20 (step S141).

The system controller 50 checks the status of the image display flag stored in the internal memory of the system controller 50 or the memory 52 (step S142). If the image display flag is set ON, the system controller 50 controls to perform quick review display (step S144). In this case, the display unit 28 is always used as an electronic finder even during an image sensing operation, and quick review display is also done immediately after the image sensing operation.

If the image display flag is set OFF in step S142, the system controller 50 sets the image display of the display unit 28 ON (step S143), controls to perform quick review display for a predetermined time, and sets the image display OFF again (step S144).

The system controller 50 reads out sensed image data written in the memory 30, performs various image processes by using the memory controller 22 and if necessary, the image processor 20, and performs image compression processing corresponding to the set mode by using the compression/expansion circuit 32. Thereafter, the system controller 50 executes recording processing of writing image data in the recording medium 200 or 210 (step S145).

If the image display flag is set ON in step S146, the system controller 50 sets the display status of the display unit 28 to the through display status (step S147), and the process advances to step S150.

In this case, after the user confirms a sensed image by quick review display on the display unit 28, the system controller 50 can set the through display status of sequentially displaying sensed image data for the next image sensing operation.

If the image display flag is set OFF (step S146), the system controller 50 sets the image display of the display unit 28 OFF (step S148), sets the status display flag ON, and displays the status of the image sensing apparatus 100 for a predetermined time (step S149). Then, the process shifts to step S150.

If the shutter switch SW1 is pressed in step S150, the process returns to step S137, and waits for the next image sensing operation.

If the shutter switch SW1 is released in step S150, the system controller 50 ends a series of image sensing operations, and returns to step S102.

Figure 4:
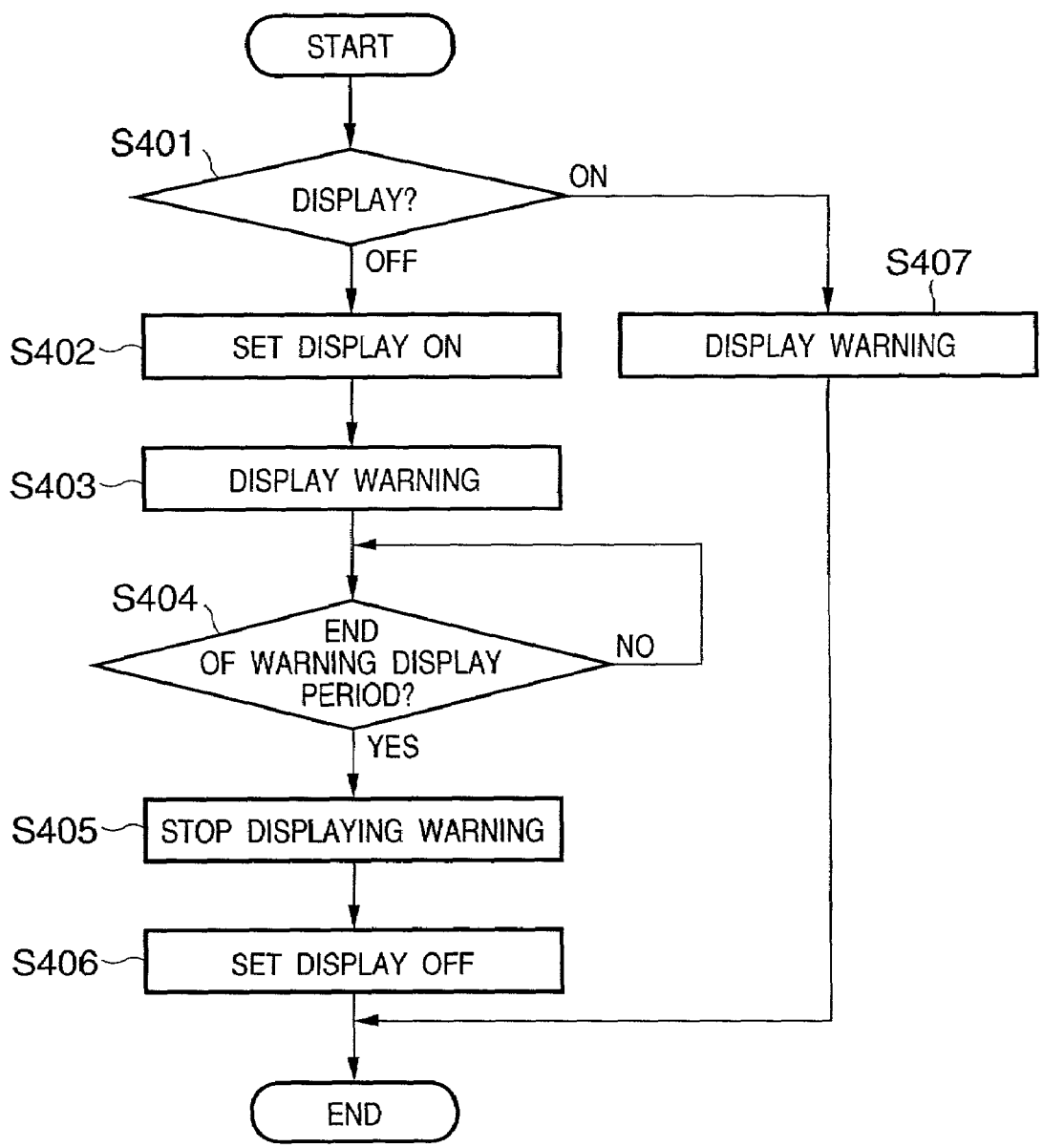
FIG. 4 is a flow chart showing a detailed operation of warning processing in FIGS. 2A and 2B.
Figure 5A:
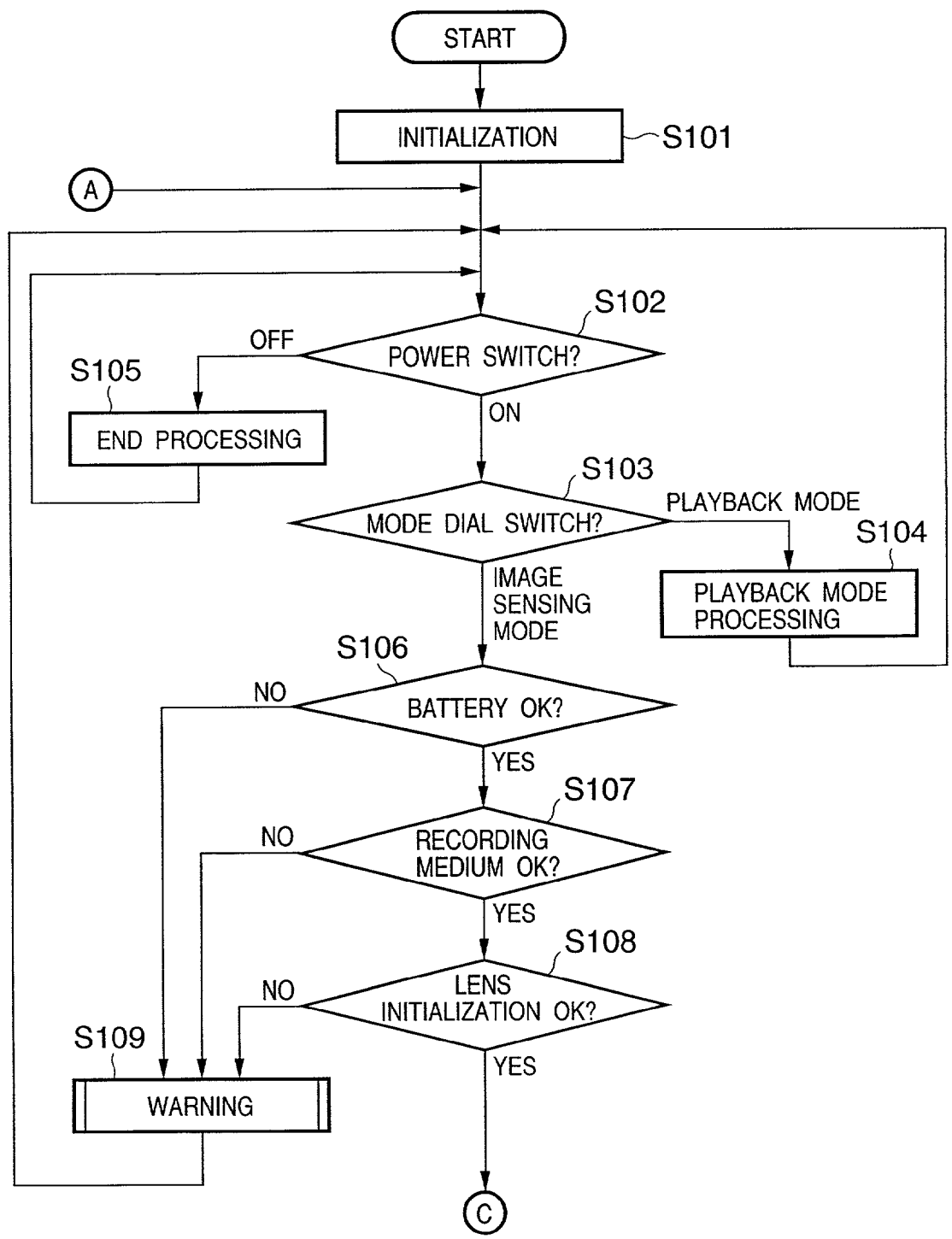
FIGS. 5A and 5B are flow charts showing the operation of an image sensing apparatus according to the second embodiment of the present invention.
Figure 5B:
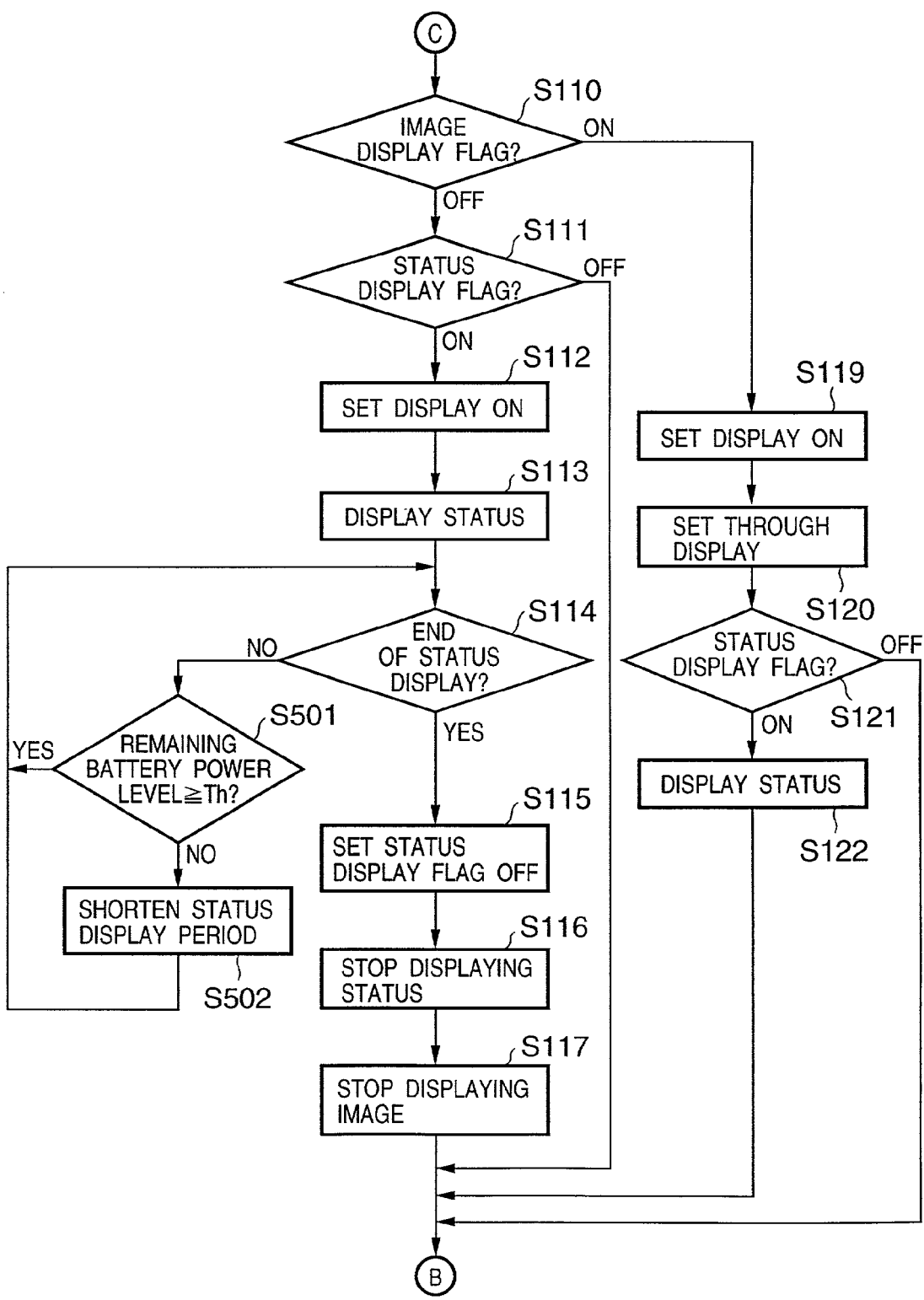
Figure 6:
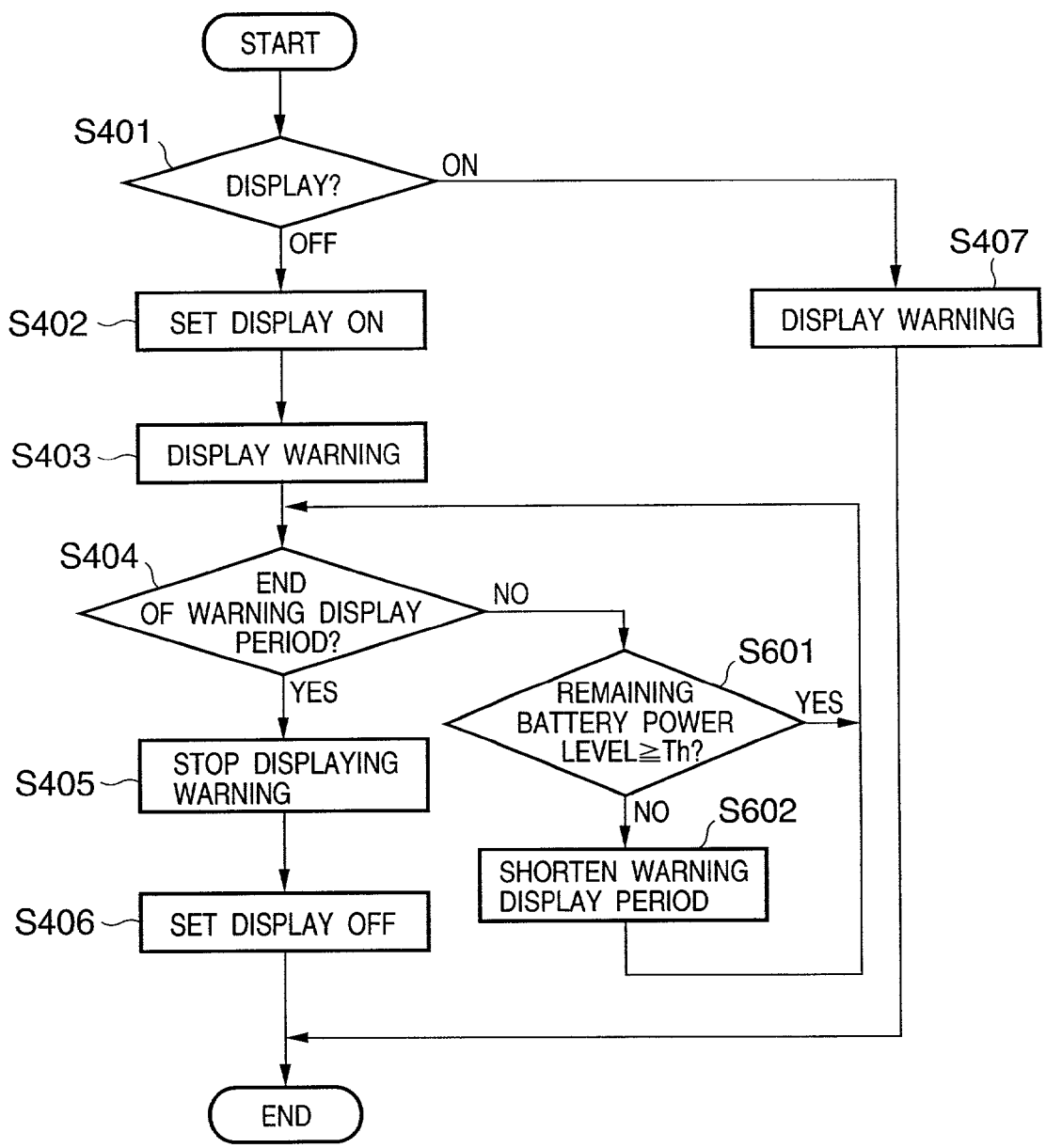
FIG. 6 is a flow chart showing a detailed operation of warning processing in FIGS. 5A and 5B.

FIG. 4 is a flow chart showing warning processing in step S109.

In warning processing, the system controller 50 checks the status of the display unit 28 (step S401). If the display is OFF, the system controller 50 sets the display of the display unit 28 ON (starts supplying power to the display unit 28) (step S402), and displays a warning on the display unit 28 (step S403). The system controller 50 keeps displaying the warning for a predetermined warning display period (step S404), stops displaying the warning when the period has elapsed (step S405), sets the display of the display unit 28 OFF (stops supplying power to the display unit 28) (step S406), and ends the processing.

If the display of the display unit 28 is ON in step S401, the system controller 50 displays a warning on the display unit 28 (step S407), and ends the processing. In addition to the aforesaid warning, it is also possible to display warning indicating errors in an internal processing of the image sensing apparatus 100

As described above, according to the first embodiment, to display information such as the status of the image sensing apparatus or a warning when the display unit is OFF, the controller controls the display unit 28 and the power source so as to set the display unit 28 ON for only a predetermined time and display the information. In this manner, it is possible to suppress the electric consumption in the image sensing apparatus 100 using the display unit 28 to display the status the image sensing apparatus 100 and warning when a dedicated information notification unit for displaying the information and warning is omitted, thereby prolonging the operation time.

Note that the image display flag for displaying sensed images on the display unit 28 in the through display status, and the status display flag for displaying information about the status of the image sensing apparatus 100 can be set by the user with the operation unit 70.

Second Embodiment

The second embodiment adds the following processing after processes in step S114 of FIG. 2B and step S404 of FIG. 4 in the first embodiment. If the status display period has not elapsed in step S114, the process shifts to step S501, and compares a remaining battery power level obtained from a power controller 80 with a preset threshold Th. If the remaining battery power level is equal to or more than the threshold Th, the remaining battery power is sufficient, and the system controller 50 returns to step S114. If the remaining battery power level is less than the threshold Th, the remaining battery power is insufficient. Thus, the system controller 50 sets the predetermined status display period shorter in step S502, then returns to step S114, and keeps the display ON till the end of the status display period.

Similarly, if the warning display period has not elapsed in step S404, the process shifts to step S601, and the system controller 50 compares a remaining battery power level obtained from the power controller 80 with the preset threshold Th. If the remaining battery power level is equal to or more than the threshold Th, the remaining battery power is sufficient, and the process returns to step S404. If the remaining battery power level is less than the threshold Th, the remaining battery power is insufficient. Thus, the system controller 50 sets the predetermined warning display period shorter in step S602, then the process returns to step S404, and keeps the display ON till the end of warning display period.

As described above, according to the second embodiment, if the power supply level of the power source drops in displaying only information about the status of the image sensing apparatus on the display unit, the display period of the display unit are shortened to prolong the operation time. The user can know the drop in power supply level from the short display period.

Other Embodiment

In the aforesaid first and second embodiments, a digital camera is used as the image sensing apparatus 100. However, the present invention is not limited to this and is applicable to various types of apparatuses having an electronic view finder mechanism such as: various types of cameras, such as an electronic camera for sensing a moving and/or a still image, a camera using a silver-halide film, a lens-exchangeable camera, a single-lens reflex camera, a leaf shutter camera, and a monitor camera; an image sensing apparatus other than cameras; an image reading apparatus; an optical apparatus; and the like.

The present invention can be applied to a system constituted by a plurality of devices (e.g., host computer, camera head, PC card) or to an apparatus comprising a single device (e.g., digital camera, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowcharts shown in FIGS. 2 to 6 described in the embodiments.

The present invention is not limited to the above embodiments and various changes and modifications can be made within the spirit and scope of the present invention. Therefore to apprise the public of the scope of the present invention, the following claims are made.

What is claimed is:

1. An image sensing apparatus comprising:
an image sensor;
a display adapted to display an image obtained by said image sensor and information about a status of the image sensing apparatus, where the information is different from the image;
a power supply unit adapted to supply power to processing circuits including said image sensor and said display;
an operation member that sets the display to be either OFF or ON;
a setting unit adapted to set either to display or not to display the information on said display; and
a controller adapted to control operating statuses of said display and said power supply unit,
wherein said controller controls said display and said power supply unit so as to set said display ON for a predetermined period, display the information, and set said display OFF after the predetermined period, when said display is set to be OFF by said operation member and the information is set to be displayed on said display by said setting unit.

2. A display method in an image sensing apparatus having an image sensor, a display for displaying an image obtained by the image sensor and information about a status of the image sensing apparatus, where the information is different from the image, an operation member that sets the display to be either OFF or ON, and a setting unit adapted to set either to display or not to display the information on said display, said method comprising:
- determining whether said display was selected to be OFF or ON by said operation member;
- determining whether or not to display the information on said display set by said setting unit;
- turning ON the display and displaying the information when the display is selected and set to be OFF and the information is set to be displayed on said display; and
- turning OFF the display after a predetermined period since the display is turned ON when OFF of the display is selected.

3. A computer readable medium containing a program having computer readable program code means stored thereon for a display method in an image sensing apparatus having an image sensor, a display for displaying an image obtained by the image sensor and information about a status of the image sensing apparatus, where the information is different from the image, an operation member that sets the display to be either OFF or ON, and a setting unit adapted to set either to display or not to display the information on said display, said program is executed by a computer and including:
- first computer readable program code means for determining whether said display was selected to be OFF or ON by said operation member;
- second computer readable program code means for determining whether or not to display the information on said display set by said setting unit;
- third computer readable program code means for turning ON the display and displaying only the information when the display is selected and set to be OFF and the information is set to be displayed on said display; and
- fourth computer readable program code means for turning OFF the display after a predetermined period since the display is turned ON when OFF of the display is selected.

* * * * *